United States Patent Office 3,555,926
Patented Jan. 19, 1971

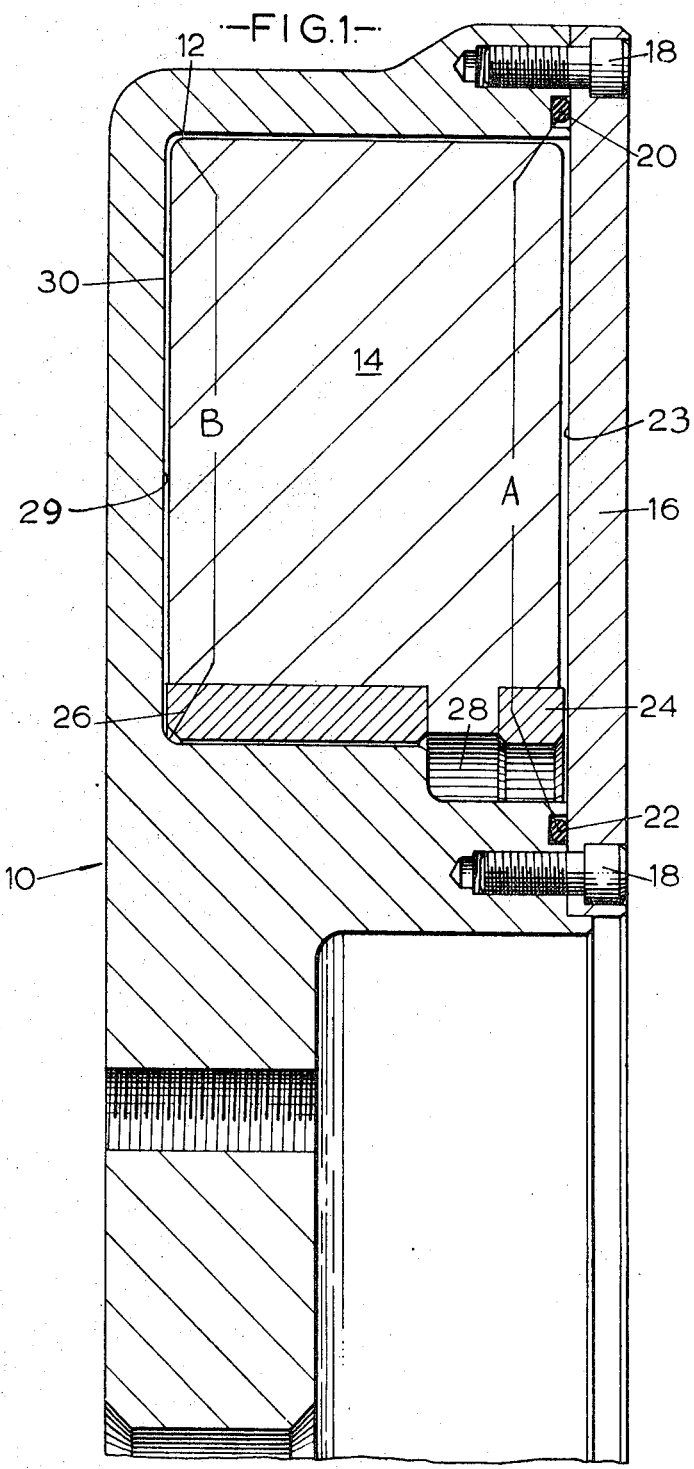

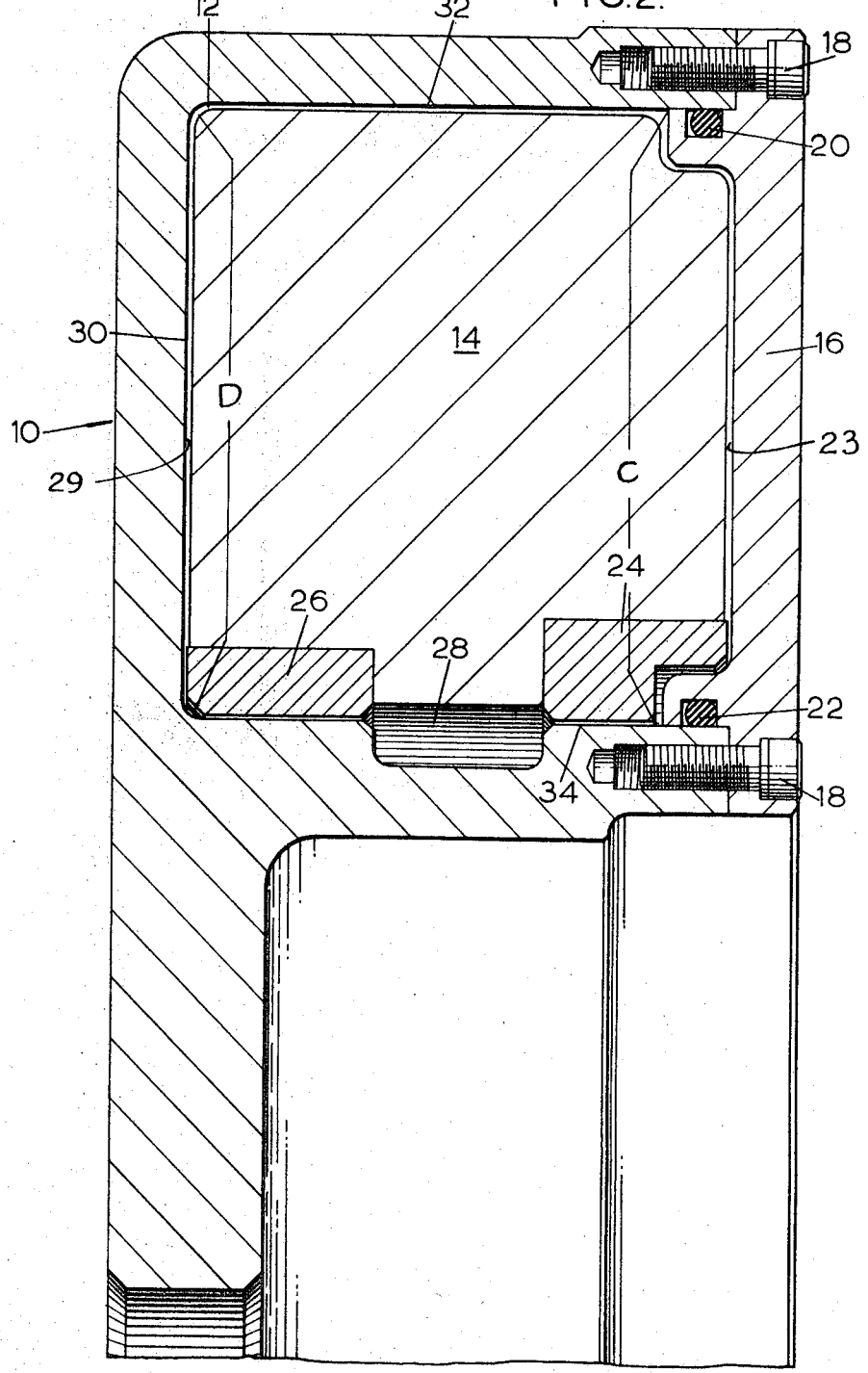

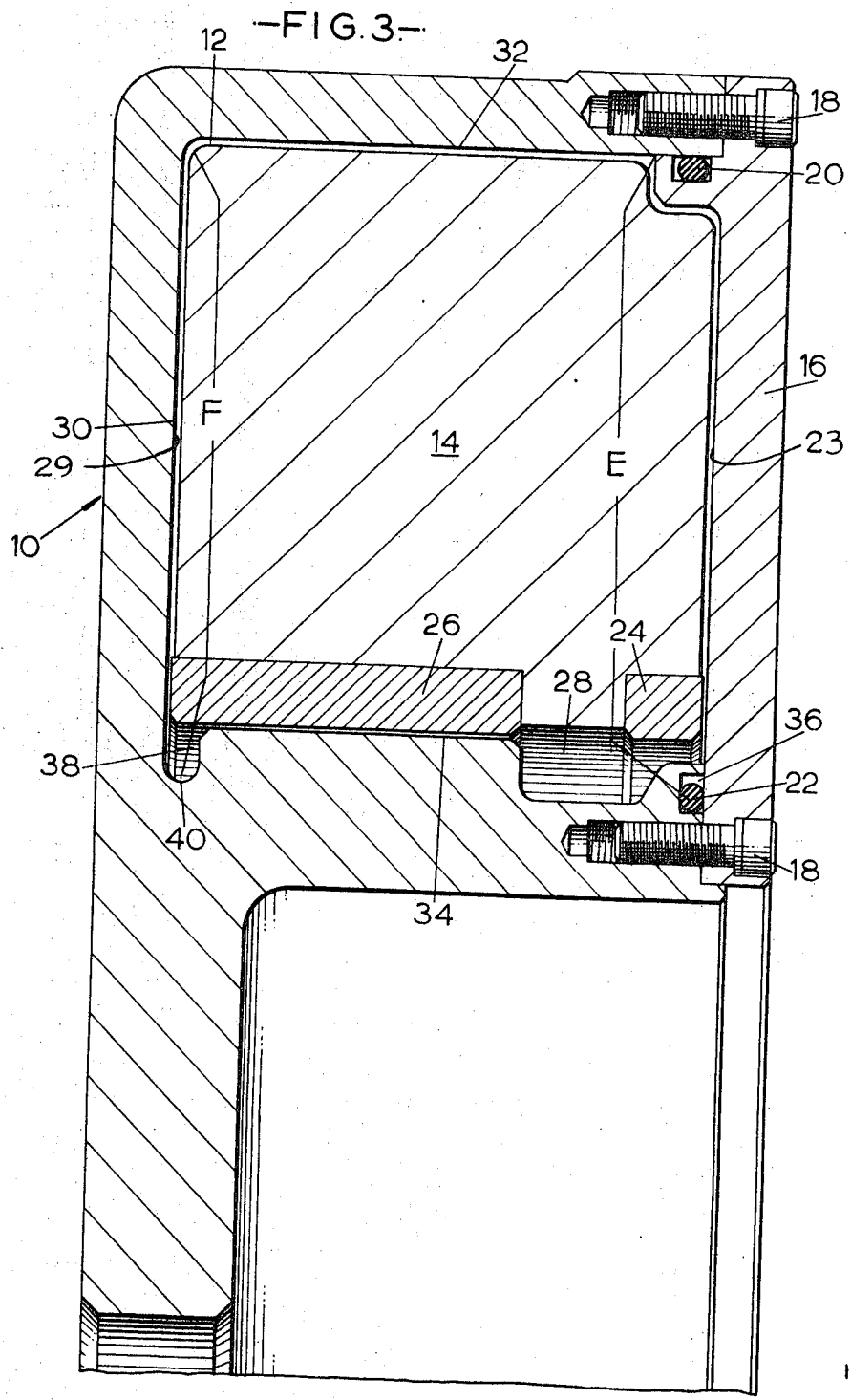

3,555,926
VISCOUS TORSIONAL VIBRATION DAMPER
Geoffrey Moorhouse, Huddersfield, and Derek Mason, Bradford, England, assignors to Holset Engineering Company Limited, Turnbridge, Huddersfield, Yorkshire, England
Filed July 17, 1968, Ser. No. 745,420
Claims priority, application Great Britain, Aug. 15, 1967, 37,356/67
Int. Cl. F16f 15/10
U.S. Cl. 74—574       3 Claims

ABSTRACT OF THE DISCLOSURE

The present invention provides a viscous torsional vibration damper of the type adapted for mounting, for example on the crank shaft of an internal combustion engine. The damper comprises an annular housing and an inertia member concentrically located within a chamber in the housing. The housing has internal axially spaced transverse chamber faces that have substantially equal axially projected areas thereby preventing uneven pressure distribution between the faces that could cause distortion of the housing.

---

The present invention relates to a viscous torsional vibration damper of the type adapted for mounting, for example, on the crank shaft of an internal combustion engine to reduce torsional vibration.

During operation, such dampers generate centrifugal forces and heat which cause the damping fluid and inertia mas to expand resulting in an increase in the pressure inside the chamber of a cylindrical sealed damper housing. In conventional dampers as presently used, the internal axially spaced transverse chamber faces of the housing are not equal in area. Consequently, the resulting axially directed fluid forces on these internal faces are unequal and tend to cause the housing to distort in the direction of the greater axial force. As the clearance between the housing and inertia mass is small, this distortion can in extreme cases result in seizure between the inertia mass and housing causing the damper to be inoperative.

According to the present invention there is provided a viscous torsional vibration damper in which the internal axially spaced transverse chamber faces of the sealed housing are substantially equal in area so that equal fluid exerting forces are distributed to the faces thus eliminating housing distortion.

The present invention will now be further described by way of example with reference to the accompanying drawings in which, FIG. 1 is a partial sectional view through a part of a prior art viscous torsional vibration damper, FIG. 2 is a partial sectional view of one form of viscous torsional vibration damper of the present invention, and FIG. 3 is a partial sectional view of another form of viscous torsional vibration damper of the present invention.

Referring to FIG. 1 there is shown a vibration damper comprising a housing 10 having an annular chamber 12 in which is concentrically disposed a standard annular inertia mass 14. A cover 16 is attached to the right side of the damper housing by means of bolts 18 and a pair of seals (20, 22) that are disposed between the cover 16 and the housing 10. The area of chamber face 23 is the annular area computed by using the distance between the two seals 20, 22 and indicated by bracket A. Thrust bearings 24, 26 are provided between the inertia mass 14 and the housing 10 and a reservoir 28 is provided for damping fluid (normally a silicone fluid). The area of chamber face 29 is the annular area of the left boundary wall 30 of chamber 12 and is indicated by bracket B. Areas A and B are subjected to damping fluid pressure, and as can be seen from FIG. 1, the A and B areas of faces 23 and 29, respectively, are not substantially equal. Thus, an unequal force distribution will develop across these faces tending to cause distortion of housing 10.

Referring now to FIG. 2, the torsional vibration damper shown is similar to that shown in FIG. 1, but the pressured area of right chamber face 23 in this case is the axially projected area of the face's contoured surface and is indicated by bracket C. The pressured area of left chamber face 29 is the same as in FIG. 1 and is indicated by bracket D. The pressured areas C and D have been made substantially equal by locating seal members 20 and 22 internally of the cover 16 so that these seal members which circumscribe the area of face 23 are now disposed against the wall members 32, 34 defining the periphery of pressure area C. These wall members 32, 34 also define the periphery of pressure area D. Thus, the improvement shown in FIG. 2 has the projected area of internal transverse face 23 equal that of transverse face 29 which results in even axial force distributions during operation and eliminates housing distortion.

In FIG. 3 there is shown an alternative embodiment wherein only one of the sealing members 20 is disposed internally of cover 16, the other seal 22 being disposed in a recess 36 formed in chamber wall 34, the recess confronting cover 16. The area of left face 29, indicated by bracket F is rendered substantially equal to the pressured area of right face 23, this pressured area being the axial projection of the face's contoured surface and is indicated by bracket E. This equality in pressured areas is effected by the provision of a recess 38 in the left end portion of chamber wall 34 which extends the area of face 29. The pressured area of face 29 is thus defined by the wall 32 and communicating radially inner wall 40 of the recess 38. The lower edge of wall 40 is substantially in horizontal alignment with the sealing point of sealing ring 22 and it can thus be seen that the axially projected area of face 23 (pressured area E) is equal to the pressured area F of face 29. In order for recess 38 to be as shallow as possible, the sealing ring 22 is increased in cross-sectional diameter to effect a greater radially outward sealing point for the ring 22.

The advantages of the damper of the present invention are that distortion caused by an increase in internal pressure in the damper in an axial direction is reduced or eliminated and thus the overload capacity of such units may be greater than prior art units.

We claim:
1. A viscous torsional vibration damper comprising a housing having open and closed transverse ends;
   a cover secured over the open end and forming an interface therewith;
   a chamber formed within the housing;
   an inertia mass located in the chamber;
   fluid contained in the chamber which internally pressures the closed and covered housing ends during damper operation;
   and sealing means positioned within the interface for equalizing radially directed and axially opposed pressured areas of the cover and closed end, thereby effecting balanced distribution of internal axially opposing pressure forces on the damper.
2. A viscous torsional vibration damper comprising a housing member having closed and open transverse ends;
   a cover member disposed over the open end; an annular chamber defined between axially spaced faces of the cover member and the housing member for enclosing an inertia mass;

and concentric fluid seals positioned between the housing and cover members for equalizing the radial pressure area of both faces thereby effecting balanced opposing axial force distributions on the faces.

3. A viscous torsional vibration damper comprising a housing member having closed and open transverse ends; a cover member disposed over the open end;
an annular chamber defined between the axially spaced faces of the cover member and the housing member for enclosing an inertia mass;
fluid seals positioned between the housing member and the cover member, at least one of the seals being located radially inwardly of the chamber inner diameter and effectively increasing the radial pressured area of the cover member;
and an annular recess formed in the housing member extending radially inwardly in continuity with the radial chamber face of the housing member to extend the radial pressured area thereof, the pressured areas being equal thereby producing balanced opposing axial force distribution on the faces.

References Cited

UNITED STATES PATENTS

| | | | |
|---|---|---|---|
| 2,514,136 | 7/1950 | O'Connor | 74—574 |
| 2,514,139 | 7/1950 | O'Connor | 74—574 |
| 2,824,467 | 2/1958 | O'Connor | 74—574 |
| 3,262,334 | 7/1966 | Edwards | 74—574 |
| 3,285,097 | 11/1966 | O'Connor | 74—574 |

FRED C. MATTERN, JR., Primary Examiner

F. D. SHOEMAKER, Assistant Examiner

U.S. Cl. X.R.

188—1